J. SMITH.
GUARD-FINGER FOR HARVESTERS.

No. 183,224. Patented Oct. 10, 1876.

Witnesses
Ellwood T. Deetz
Harry Smith

Jonathan Smith
by his Attorneys
Howson and Son

UNITED STATES PATENT OFFICE.

JONATHAN SMITH, OF BUCKINGHAM, PENNSYLVANIA.

IMPROVEMENT IN GUARD-FINGERS FOR HARVESTERS.

Specification forming part of Letters Patent No. 183,224, dated October 10, 1876; application filed July 17, 1876.

*To all whom it may concern:*

Be it known that I, JONATHAN SMITH, of Buckingham, Bucks county, Pennsylvania, have invented certain Improvements in Mowing-Machines, of which the following is a specification:

My invention relates to an improvement in that class of mowing-machines in which the cut is made between the edge of a reciprocating cutting-bar and the edge of a rocking plate; and the object of my invention is to so construct a machine of this class that a steady bearing is afforded for the rocking plate, while the latter can easily be detached and replaced when necessary. This object I attain in the manner which I will now proceed to describe, reference being had to the accompanying drawing, in which—

Figure 1:
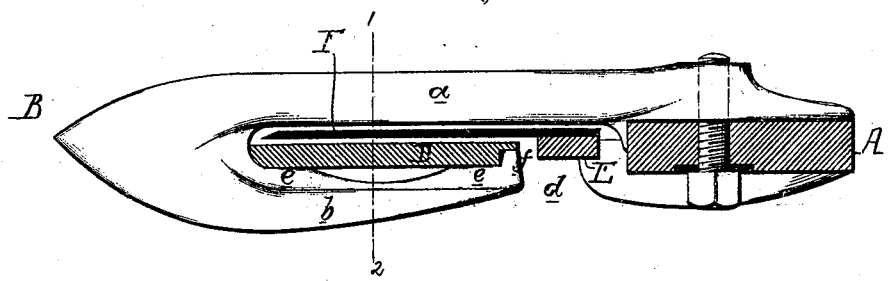
Figure 2:
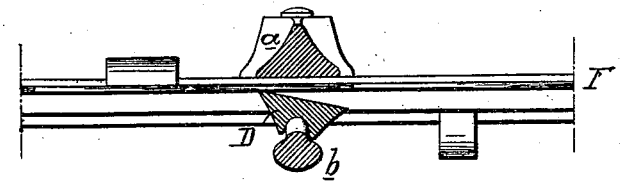

Figure 1 is a longitudinal section of the guard-bar of a mowing machine with my improvements, the guard itself being shown in elevation; Fig. 2, a transverse section of the guard on the line 1 2, and Fig. 3 a modification.

In Figs. 1 and 2, A is the guard-bar of the machine, and B one of the guards attached to the same, and consisting of an upper arm, $a$, and a lower inwardly-bent finger, $b$, terminating at some distance from the bar A, so as to leave an open space, $d$, between the two, for a purpose explained hereafter.

The upper face of this finger is recessed in the present instance, so as to form bearings $e$, on which rests a plate, D, each edge of which is ground to a sharp cutting-edge. This plate D is free to rock on the finger, but is prevented from being displaced longitudinally by a lug, $f$, at the end of the same, while the lateral displacement of the plate is prevented partly by the projections on the finger, and partly by the knife-plate above. E is the cutter-bar carrying the knives F, which are so arranged that there is a space between their under sides and the upper edges of the plates D, so that as the cutters are reciprocated the grass is confined between the edges of the knives and the edges of the rocking plates, and the pressure upon the edges of the plates D causes the latter to rock until their cutting-edges come in contact with the cutting-edges of the knives F, the grass being cut between these two edges. Owing to the inclined cutting-edges of the knives F, and to the fact that the edges of the plates D are pressed firmly against the under sides of the same, the result is a shearing or scissor-like cut, which effectually severs the grass between the two cutting-edges. Owing to this scissor-like cut, also, the tendency of the grass to jam between the cutting-plate and knife is prevented, and the necessity of running the cutter-bar at a high rate of speed in order to overcome this tendency is obviated.

Figure 3:
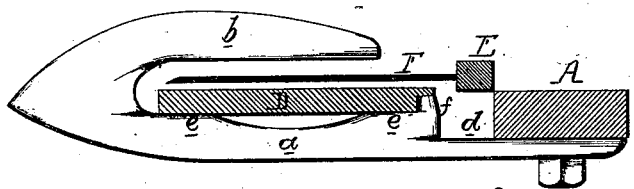

Fig. 3 shows a modification of my invention, in which the inwardly-bent finger $b$ of the guard is above instead of below the portion $a$, the rocking plate in this case having its bearings on the said portion $a$, which has a recess, $d$, to allow the escape of cut grass.

It will be evident that by dispensing with pivots on the rocking plate D, forming both its bearings on the guard, and providing a recess, $d$, at its rear end, the grass can escape as rapidly as it is cut without danger of interfering with the movements of either the plate or cutter-bar.

Another advantage of this mode of construction is that it allows the plate D to be readily removed and replaced when necessary for sharpening, repairs, or other purposes.

I claim as my invention—

1. The combination of the detachable plate D, with a guard, B, having bearings $e$ on which the said plate D rests, and is free to rock, as set forth.

2. The combination of the plate D with the guard B, its bearings $e$ for the plate, and its lug $f$, as set forth.

In testimony whereof I have signed my name to this specification in the presence of two subscribing witnesses.

JONATHAN SMITH.

Witnesses:
ELLWOOD F. DEETZ,
HARRY SMITH.